United States Patent Office 2,757,131

Patented July 31, 1956

2,757,131

CONCENTRATION OF UNSATURATED ALDEHYDES

John Howlett and Cecil Alfred Lamburd, Tonbridge, England, assignors to The Distillers Company Limited, Edinburgh, Scotland, a British company No Drawing. Application November 3, 1950, Serial No. 194,043

Claims priority, application Great Britain December 21, 1949

8 Claims. (Cl. 202—52)

The present invention relates to the concentration of unsaturated aldehydes from dilute aqueous solutions thereof by distillation, and the recovery of said aldehydes in concentrated form, and refers in particular to the concentration of acrolein and methacrolein.

In the production of unsaturated aldehydes by the oxidation in the gaseous phase of olefines by means of molecular oxygen, for instance with the aid of metallic catalysts in the presence in the reaction zone of elementary selenium, the gaseous mixture resulting from the reaction contains, in addition to the aldehydes produced, unreacted olefines, carbon dioxide which is produced by complete combustion of said olefines, and oxygen which had been applied in excess and has remained unreacted during the conversion into the aldehydes. The aldehydes are generally recovered from these mixtures by extraction with water. The aqueous solutions thus obtained are dilute and, in order to recover therefrom the aldehydes in a concentrated and substantially pure form, have to be distilled. During the distillation the oxygen absorbed in the aqueous solution causes considerable trouble by catalysing the polymerisation of the unsaturated aldehyde. The polymerised products soon make the column unusable. Thus, for instance, when the distillation of dilute acrolein solution is carried out in the ordinary way the deposition of polymerised material in the rectifying column becomes noticeable after a very short time and makes the column substantially completely unworkable within 3 to 4 days.

It has been suggested to overcome this difficulty either by duplicating the distillation equipment which involves increased capital investment and maintenance costs or by the addition of hydroquinone to the still feed or to the still column head, but the polymer formation can be reduced by this latter method only to a very limited extent when the amount of hydroquinone added is adjusted to the quantity of oxygen absorbed in the feed solution. By increasing the amount of hydroquinone in excess of that required theoretically to react with all the oxygen present, the working period of the rectifying column and the stills may be prolonged, but even then in general the equipment does not work for more than about 15 days. In addition the use of hydroquinone in such quantities means a considerable expense which represents a substantial fraction of the total cost of the production of the aldehydes.

It has now been found that the formation of polymers during the distillation of the unsaturated aldehydes from their dilute aqueous solutions can be practically completely obviated and the operational period of the distillation equipment thereby extended almost indefinitely by subjecting the said aqueous solutions prior to distillation to a brief heating at elevated temperatures whilst maintaining the pH of said solutions between 5 and 8, preferably between 6 and 7. The temperatures at which the aqueous solution are heated are near to and including the boiling point of said solutions. The heating may be carried out at atmospheric or preferably, at reduced pressures. When heating at atmospheric pressures the temperature is maintained preferably between 95 and 100° C. The time of heating under these conditions should be sufficient to desorb substantially the oxygen from the solution but not sufficiently long to cause any appreciable hydration of the aldehyde in the solution. In general a few seconds for instance from two to twenty seconds will be sufficient to achieve practically complete desorption of the oxygen. When on the other hand the heating is carried out at reduced pressures the temperature to which the solution is to be heated may be considerably reduced, and this has the advantage that the duration of heat treatment becomes less critical and may be extended without causing hydration of the aldehydes. Thus it has been found that when the pressure was reduced to 100 millimeters Hg the heat treatment at not substantially more than 45° C. could be extended to between 2 and 3 minutes and that this was sufficient to substantially expel the oxygen contained in the solution whilst not more than about 1% of the aldehyde was hydrated. The time necessary for removing from the solution the absorbed oxygen substantially completely at the temperature and pressure under which the heating is conveniently effected may easily be ascertained by preliminary experiment. By substantially complete removal of the absorbed oxygen is understood a desorption which does not leave in the aqueous solution more than 2% of the quantity of oxygen which the solution is capable of absorbing in contact with air.

The heating may be effected either indirectly or by the introduction of live steam into the solution or by a combination of both. The preferred method when working under atmospheric pressure consists in passing the aqueous solution in the form of a thin film through a heated vertical tube, conveniently in a downwards direction. The length of the heating tube is advantageously adapted to the time during which the solution is subjected to the heating process at the rate of flow at which the solution is passed through the heated zone. When the heating is carried out under reduced pressure, on the other hand, it is preferred to effect it in a packed column.

Any aldehyde which may be carried away by the released gas may be retained in, for instance, a short column on top of the heating arrangement by, for instance, scrubbing with a small amount of solvent, such as water, and refluxed to the aqueous solution.

After this heat treatment the solution may be cooled or, preferably, in order to avoid loss of heat, introduced into the distillation equipment, such as a packed column or a column provided with bubble caps, wherein the solution is heated to boiling and the aldehyde is taken off overhead.

Continuous fractional distillation under reflux occurs in the distillation equipment as described in the examples below.

Hydroquinone in small quantities may with advantage be added either to the aqueous solution after the heat treatment or subsequently, for instance, to the still head. Alternatively, or in addition thereto, the application of a nitrogen seal may be found to be useful to prevent access of air. In some cases it may be convenient to bring the aqueous solution of the aldehydes coming from the conversion reactor before it is subjected to the heat treatment according to the process of this invention into contact with metals such as iron or copper, preferably by passing it over and/or through a layer of the metal turnings. By this means the subsequent substantially complete removal of the absorbed oxygen from the solution by heat treatment is facilitated.

The following examples illustrate the manner in which the invention may be carried out in practice. It should be understood, however, that the process of the invention is not restricted to the treatment of acrolein and methacrolein solutions, but may similarly be applied to the concentration of aqueous solutions of other unsaturated aldehydes, which tend to polymerize under the influence of oxygen.

*Example 1*

An aqueous solution containing 0.4% acrolein and having a pH value of 6.5 is fed into the top of a vertically placed steam jacketed tube with an internal diameter of 1 inch, and having a length of 6 feet, at the rate of 15 gallons/hour. The heating is so arranged that the liquid is kept at a temperature between 95 and 99° C. At the top of the tube is a small water scrubber into which is fed 0.25 gallon of water/hour by which means any acrolein escaping from the steam jacketed tube is washed out and refluxed. The heated liquor at the base of the heater is fed into a heated distillation column at the top of which acrolein is taken off, whilst the stripped water runs off at the base. The contact time in the jacketed tube, which is maintained at atmospheric pressure is only a few seconds. The hydration of the acrolein in the aqueous solution amounted to 1.1%. No loss of acrolein could be detected. Hydroquinone to the extent of 0.236 gram per hour in the form of 5.9 cc. of a 4 percent solution in acrolein was added to the still head. This corresponds to about 1/20 of that which would have been required to satisfy the theoretical amount of oxygen in the feed per hour, saturated with air at 15° C., had no deaeration been carried out as described. No polymer formation was noticed in the still column after a run of several weeks.

*Example 2*

15 gallons per hour of a solution containing 0.4% of methacrolein and having a pH of 6.8 was fed into the top of a mild steel column. The internal diameter was 4 inches, the total length of which was 12 feet. 10 feet of this column was filled with 1/2 inch porcelain Raschig rings. The whole system was kept under a pressure of 100 mm. mercury. Live steam was injected at the base of the column, the temperature being 48° C. The effluent at the base of the column was substantially free from oxygen and hydration of the aldehyde was approximately 1% of the aldehyde fed. The effluent was then conducted to the distillation unit, which after 3 weeks showed no sign of polymer formation either in the stripping or in the fractionation columns which were both kept under a nitrogen cover.

The desorbed gases were washed in a small mild steel scrubber at the top of the column into which 5 pounds of water per hour was fed. This dissolved the aldehyde and thus eliminated losses.

A very slight polymer formation was observed in the vapour line entering the condenser after a run of several weeks duration. By introducing at the entrance of the still head some hydroquinone (about 1/10 to 1/20 of the theoretical amount) dissolved in methacrolein in this slight polymerisation may be reduced still further.

*Example 3*

Into a column as described in Example 2 was introduced a solution of acrolein in water containing 0.4% by weight acrolein and having a pH of 6.5. The rate of feed was the same as that in Example 2 and the pressure maintained in the system 100 mm. Hg absolute. Live steam was introduced into the base of the column and the temperature therein 47° C. The contact time of the aqueous solution with the heated zone amounted to about 3 minutes during which practically no hydration occurred.

The effluent was taken to a distillation system where it was distilled under atmospheric pressure. The distillation yielded an acrolein of about 96% strength and was maintained for 7 weeks without showing substantial polymer formation.

We claim:

1. A process, which comprises subjecting an aqueous free-oxygen-containing solution of unsaturated olefinic aldehyde capable of polymerisation in the presence of oxygen, at a pH of 5 to 8 to a heating step, removing substantially all of said oxygen by said heating prior to subsequent fractional distillation mentioned hereinbelow and recovering the unsaturated olefinic aldehyde from the resulting solution without substantial polymerisation by continuous fractional distillation under reflux.

2. A process as claimed in claim 1, wherein the time of heating when working at approximately atmospheric pressure and a temperature between 95° and 100° C. is between two and twenty seconds.

3. A process as set forth in claim 2, wherein the solution is subjected to said heating prior to distillation, in the form of a film.

4. A process as set forth in claim 1, wherein the time of heating at a pressure of 100 mm. Hg absolute and a temperature between 45° and 50° C. is two to three minutes.

5. A process according to claim 1, wherein the solution is brought into contact with comminuted metals selected from the group consisting of iron and copper, before it is subjected to the heat treatment.

6. A process according to claim 1, wherein a small amount of hydroquinone is added to the aqueous solution.

7. A process in accordance with claim 1, in which the unsaturated olefinic aldehyde is acrolein.

8. A process in accordance with claim 1, in which the unsaturated olefinic aldehyde is methacrolein.

References Cited in the file of this patent

UNITED STATES PATENTS

| | | |
|---|---|---|
| 2,267,829 | Lange | Dec. 30, 1941 |
| 2,334,091 | Herstein | Nov. 9, 1943 |
| 2,383,711 | Clark et al. | Aug. 28, 1945 |
| 2,400,370 | Placek | May 14, 1946 |
| 2,514,961 | Max | July 11, 1950 |

OTHER REFERENCES

Chemical Engineering, December 1947, pages 107–109, article by F. G. Watson.